Oct. 29, 1929.  E. C. HERTHEL  1,733,800
TREATMENT OF CASINGHEAD GASOLINE
Filed June 13, 1927
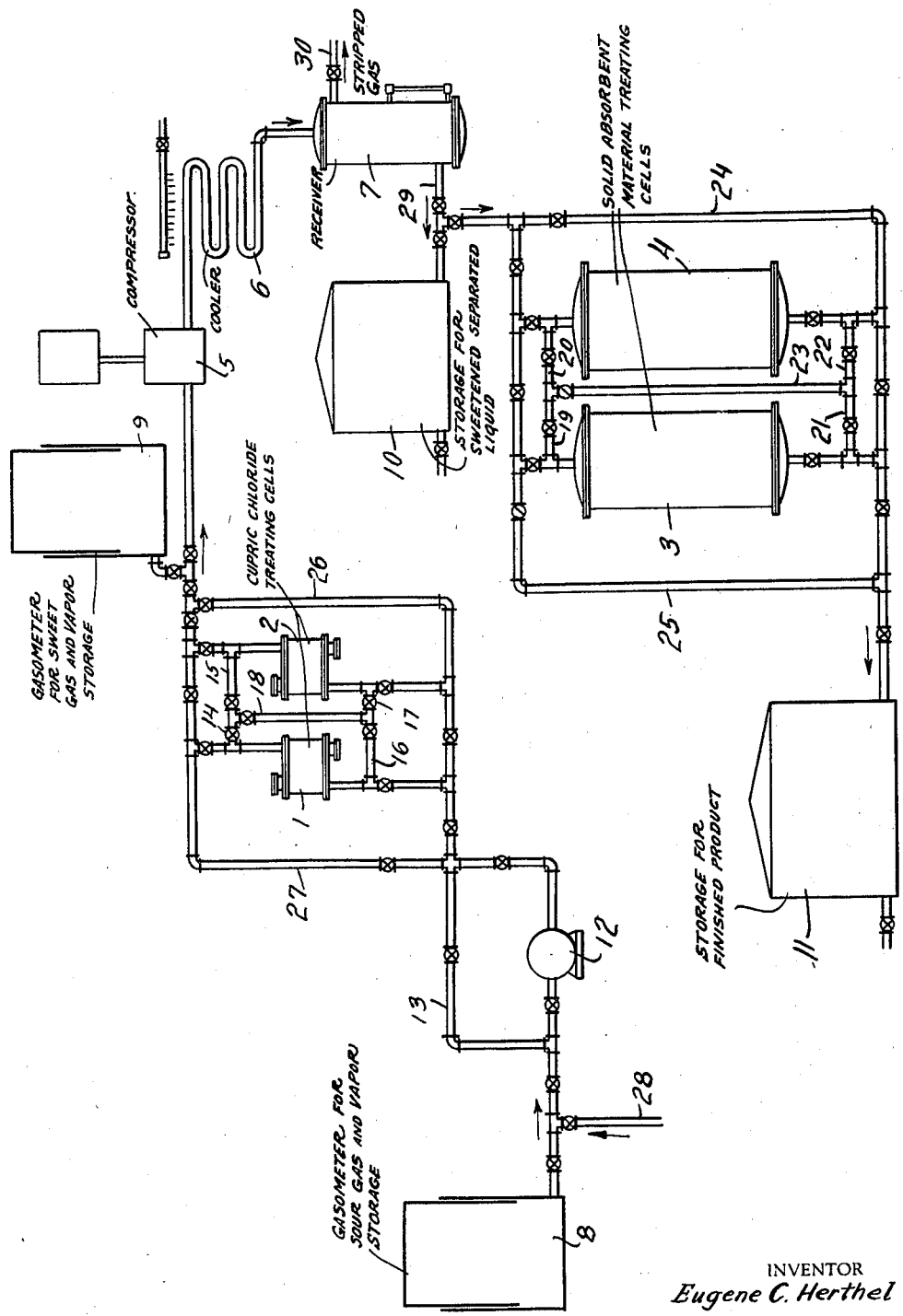
INVENTOR
*Eugene C. Herthel*
BY
ATTORNEYS Patented Oct. 29, 1929

1,733,800

UNITED STATES PATENT OFFICE

EUGENE C. HERTHEL, OF CHICAGO, ILLINOIS, ASSIGNOR TO SINCLAIR REFINING COMPANY, OF NEW YORK, N. Y., A CORPORATION OF MAINE

TREATMENT OF CASING-HEAD GASOLINE

Application filed June 13, 1927. Serial No. 198,445.

This invention relates to improvements in the manufacture and treatment of casing-head gasoline, natural gas gasoline or other light hydrocarbon liquids recoverable from mixtures of hydrocarbon gases and vapors incondensable at ordinary temperatures and pressures. The invention is of special value and application in the manufacture and treatment of gasoline recoverable from pressure still tail gases and other refinery gases from which appreciable quantities of light hydrocarbon liquids may be recovered by the ordinary compression or absorption recovery processes.

Gases or gas and vapor mixtures of the type above referred to usually contain constituents commonly called "sour" elements which are corrosive and give to condensates recovered therefrom an undesirable color and render them unstable when exposed to sunlight. One particularly advantageous method of treating such condensates is described in a prior application filed May 29, 1926, by Ernest B. Phillips and James G. Stafford, Serial No. 112,638, Patent No. 1,687,992, Oct. 16, 1928.

Not only is the presence of these "sour" elements objectionable in the final product, but their presence in the gas and vapor mixture in a highly reactive form interferes to a great extent with the recovery of liquefiable constituents by causing corrosion of compressor valves and parts in compression recovery systems and by more or less permanently poisoning absorbent menstrums in absorption recovery systems.

According to the present invention, the gas or vapor mixture which is to be treated for recovery of liquefiable constituents contained therein, while substantially free from water or water vapor, is subjected to treatment with solid cupric chloride and the so treated gas or vapor mixture subsequently subjected to a compression or absorption treatment to obtain the more readily condensable vapors in a liquid form. During the cupric chloride treatment, the "sour" elements present in the gas and vapor mixtures are apparently converted into an inactive form, but the reaction products, or at least a part of the reaction products may remain in the gas and vapor mixture and appear in the liquid condensate obtained therefrom. The reaction products resulting from the cupric chloride treatment are of such character that condensates which would otherwise become colored when treated with alkali plumbite usually fail to respond to this test even in the presence of an excess of elementary sulphur. Further, the reaction products of these "sour" elements are so "fixed" by the cupric chloride treatment that any tendency to corrode compressor valves and parts or poison absorbent menstrums is much reduced or eliminated. The reaction products appearing in the liquid condensate from such operations are also of such a character that they may be effectively removed by treatment of the condensate with solid absorbent materials such as fuller's earth or similar absorbent earths or clays.

The invention will be further described in connection with the accompanying drawings which illustrate one form of apparatus adapted for carrying out the process of the invention. It will be understood that this more detailed description of the invention is intended as an exemplification of the invention and that the invention is not limited thereto.

Referring to the drawings, the apparatus illustrated comprises four treating cells 1, 2, 3 and 4, each of these being provided with appropriate parts for supplying and discharging finely divided solid materials, and with suitable screens to prevent escape of such solid materials from the cells. Cells 1 and 2 are filled with crystalline cupric chloride and cells 3 and 4 with a finely divided solid absorbent medium such as fuller's earth. Duplicate cells are provided in each case to permit the discharging and recharging of one while the gas and vapor mixture under treatment or the condensate produced therefrom is flowing through the other.

Compressor 5 and cooler 6 may be of the ordinary design and construction generally employed in the recovery of liquefiable constituents from gas and vapor mixtures. Cooler 6 is connected with a separator 7 from which the stripped gases and liquid products may be separately withdrawn. Compressor 5 and cooler 6, may, if desired be replaced by suitable apparatus for separating liquefiable constituents from gas and vapor mixtures by absorption and redistillation in the well known manner in the art. Gasometers 8 and 9 and storage tanks 10 and 11 may advantageously be provided to permit flexible operation of the entire system.

In the arrangement of apparatus illustrated a gas pump 12 provided with a valved by-pass connection 13 is arranged to supply gases and vapors from gasometer 8 or directly from a suitable source of supply through connection 28 to cells 1 and 2. Valved connections 14 and 27 are arranged so that cells 1 and 2 or 3 and 4 may be operated in series or in parallel with upward or downward flow through each as desired. Valved by-pass connections 25 and 27 are arranged to permit direct discharge of the gas and vapor mixture or of the liquid condensate around the respective treating cells.

In the operation of the apparatus illustrated a gas and vapor mixture may be drawn directly from any suitable source of supply or from the gasometer 8 through by-pass connection 13 and cell 1 or 2 by the compressor 5. Where it is desired to continue the cupric chloride treatment of the gas and vapor mixture while compressor 5 is not operating or where the gasometer 9 is floating on the line so as to prevent the compressor acting to create a vacuum in the suction line, the gas pump or blower 12 may be operated to maintain the flow of gas and vapors through the treating cells. In passing through either of cells 1 or 2 the gas and vapors are brought into intimate contact with finely divided solid cupric chloride which operates to "fix" the solid elements. To avoid any difficulties from possible caking of the cupric chloride and to insure a maximum of contacting surface it is sometimes advantageous to fill cells 1 and 2 with an inert carrier having a large exposed surface with solid cupric chloride distributed thereon. Control of the operation involves simply the maintenance of contact between the gas and vapor mixture and the refining agent employed for a period of time sufficient to effect "fixing" of the "sour" elements to the extent necessary in any particular case.

Liquids condensed at the temperature and pressure maintained in cooler 6 are separated from the gas and vapors remaining uncondensed in separator 7 and are separately withdrawn therefrom through connections 29 and 30 respectively. The separated liquid may be conveyed directly to storage tank 10 or passed through either of cells 3 or 4 in intimate contact with the finely divided solid absorbent medium therein, thereby removing reaction products of the cupric chloride treatment contained in the liquid condensate.

The following specific example will serve to illustrate the effect of the cupric chloride treatment on a characteristic gas and vapor mixture containing "sour" elements:

A raw "sour" casinghead gas mixture from the Burbank field having a sulphur content of .0030%, by suitable compression and cooling, without preliminary treatment with cupric chloride was found to yield 1.83 gallons of "sour" casinghead gasoline per 1000 cubic feet of gas. The gasoline obtained therefrom had a sulphur content of .040% and showed a positive coloring when agitated with a solution of sodium plumbite.

The gas mixture from the same source was treated in accordance with the present invention by passing the raw gas through a cell containing solid cupric chloride prior to the compressing and cooling operations. Analysis of an average sample of the raw gas used gave a sulphur content of .0035%. On compressing and cooling, as in the operation first mentioned a yield of 2.15 gallons of casinghead gasoline was obtained. Analysis of the casinghead gasoline obtained therefrom gave a sulphur content of .040%. The condensate without further treatment, however, did not change color when agitated with a solution of sodium plumbite even in the presence of an excess of sulphur.

The sweetening effect of the cupric chloride crystals on the raw gas was positive and definite. Whenever the treating cell was cut out, the condensate became "sour" at once, and became sweet again when the cell was cut in.

The process of the invention is extremely simple in both operation and control. Further advantages of the invention are that, except as to constituents the removal of which is desired, the gas and vapor mixture or the condensate obtained therefrom is substantially unaffected and the operation does not involve loss of constituents suitable as components of the desired products. Likewise, the finished product is substantially free from constituents introduced by the refining operation.

Cupric chloride distributed on an inert carrier such as pumice or coke is the invention of Ernest B. Phillips, resident of East Chicago, in the county of Lake, State of Indiana, and of James G. Stafford, resident of Chicago, in the county of Cook and State of Illinois.

I claim:

1. The improvement in the manufacture of gasoline from gas and vapor mixtures, comprising subjecting the gas and vapor mixture while substantially free from water to treatment with a solid cupric chloride, and subsequently treating the gas and vapor mixture to liquefy the condensable vapors.

2. The improvement in the manufacture of light hydrocarbon liquids from a mixture of hydrocarbon gases and vapors comprising subjecting the gas and vapor mixture while substantially free from water to treatment with solid cupric chloride, subsequently treating the gas and vapor mixture to liquefy condensable vapors, separating the liquefied product from the gases and vapors remaining uncondensed, and thereafter treating the separated liquid with a solid absorbent medium, whereby reaction products of the cupric chloride treatment are removed from the separated liquid.

3. The improvement in the manufacture of light hydrocarbon liquids from hydrocarbon gas and vapor mixtures comprising continuously flowing a stream of the gas and vapor mixture while substantially free from water through a body of finely divided solid cupric chloride, and subsequently treating the said gaseous mixture to separate liquefiable constituents therefrom.

4. The improvement in the manufacture of light hydrocarbon liquids from a mixture of hydrocarbon gases and vapors comprising flowing a stream of the gas and vapor mixture through a body consisting of solid cupric chloride distributed on an inert carrier with a large exposed surface, and subsequently treating said gas and vapor mixture to liquefy the condensable vapors.

In testimony whereof, I have subscribed my name.

EUGENE C. HERTHEL.